Patented Mar. 7, 1933

1,900,605

UNITED STATES PATENT OFFICE

TORKILD VALDEMAR HEMMINGSEN, OF COPENHAGEN, DENMARK

CONTROLLING DEVICE FOR CONTROLLING PISTONS OF INTERNAL COMBUSTION ENGINES

Application filed June 29, 1929, Serial No. 374,709, and in Denmark July 14, 1928.

This invention relates to a controlling device for controlling pistons of internal combustion engines having a working piston and one or more controlling pistons driven from the main crank shaft on the engine and controlling the scavenging ports and the exhaust ports respectively. The characterizing feature of the invention is that to each controlling piston or set of controlling pistons belonging to a cylinder a single eccentric, crank pin or the like is provided on the crank shaft between the main crank corresponding to a cylinder and a main bearing of the crank shaft, the said eccentric, crank pin or the like controlling the motion of the controlling piston or pistons. Each section of the main crank shaft lying between two main bearings thus comprises, according to the invention, a main crank pin to which the energy of the working piston is transmitted, and a smaller crank pin, eccentric of the like controlling the motion of the controlling piston or pistons, the said motion being transmitted by a suitable link and rod system. This rod system is combined with crossheads with which the controlling pistons are connected and moves in paths parallel with these of the controlling pistons. Several arrangements of rod system are known by which the motion of a controlling piston in opposite directions to that of the working piston is effected. In some known devices the motion of the controlling piston is controlled by secondary controlling or cam shafts connected by suitable rods with crossheads to which the controlling pistons are fixed. In other known devices the actual main crank shaft is employed, this shaft being so shaped that each section of the crank shaft lying between two main bearings has three crank pins, viz, a central crank pin for the connecting rod of the working piston and symmetrically with respect to this two other crank pins controlling the motion of the controlling piston or pistons. In both of these known devices, however, the reciprocating parts as well as the crank or controlling shafts controlling the motion of the controlling pistons become rather heavy.

Compared with these known devices the invention characterizes a considerable technical effect, each section of the crank shaft forming only one main crank pin and one secondary crank pin or eccentric. The invention is practically so performed that the motion of the eccentric or the secondary crank pin is transmitted by a connecting rod to a lower crosshead rigidly connected with two tie rods. These rods may be rectilinearly moved in cylindrical guides, their motion being parallel to that of the controlling rods, even if their motion does not take place in the same plane as the latter but in a plane parallel therewith. The motion then may be transmitted by inclined rods between the plane defined by the crosshead of the controlling piston and the axis of the piston and the plane defined by the lower crosshead and the tie rods secured thereto. According to the invention the distance between the main bearings may be smaller than in the known devices, which brings the advantage that the entire construction of the engine is lighter, because the distance between the cylinders may be reduced and the crank shaft may be made lighter. Furthermore, the invention brings the advantage that parts requiring lubrication because of mutual rotation taking place between them may be placed near the crank shaft while that portion of the moving parts next to the controlling piston or pistons and moving in paths parallel to those of the controlling pistons may be rigidly connected with each other and with the controlling pistons. Thus the first mentioned parts may be enclosed in the closed crank case or in compartments communicating therewith, while the remaining parts may be placed outside the closed crank case, the rectilinear moving rods, which transmit the motion from the interior of the crank case to the parts outside the same, being carried through the wall of the crank case by means of oil-tight cylinder guides. The invention is illustrated in the drawings by a constructional form.

Figure 1:
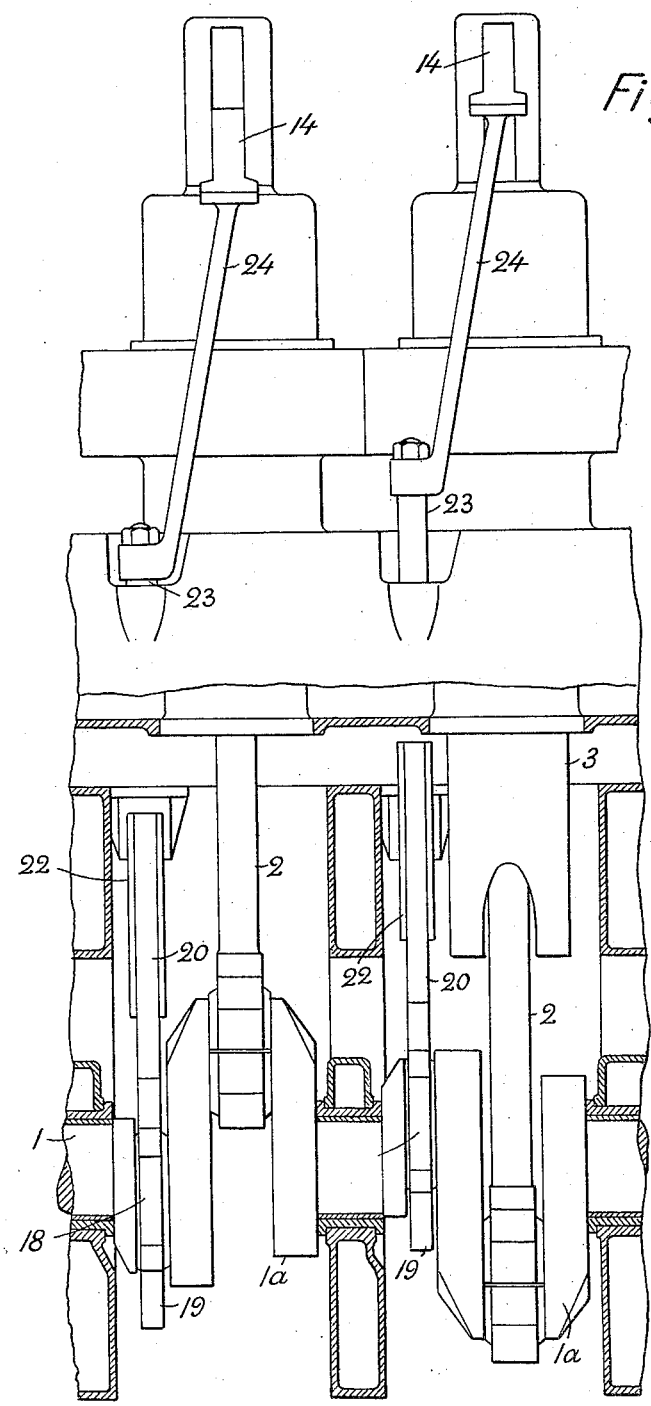
Fig. 1 is a partly sectional side elevation of two cylinder units of a single-acting engine having a controlling device according to the invention.
Figure 2:
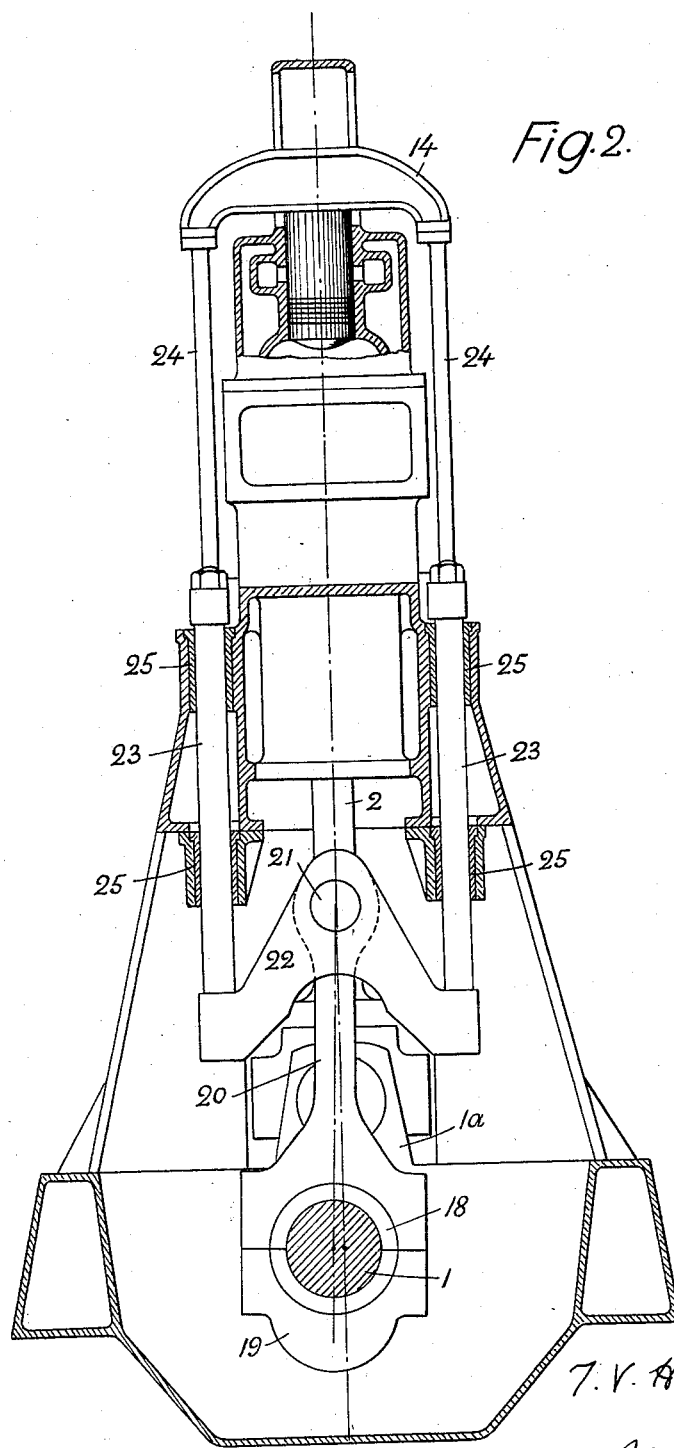
Fig. 2 is a partly sectional end elevation of one of the cylinder units shown in Fig. 1.

In the constructional form shown in the drawings the motion of the controlling pistons is controlled by an eccentric on the crank shaft 1. As appears from Fig. 1, an eccentric 18 for each cylinder is placed on one side of the crank 1ª corresponding to the cylinder and connected with the working piston 3 by the connecting rod 2. The eccentric disc 18 is surrounded by an eccentric strap 19 forming the head of a connecting rod 20 through which the motion is transmitted to the controlling piston. The upper portion of the rod 20 forms an eye by which the connecting rod is pivotally connected with a pivot 21 of a crosshead 22, Fig. 2. The crosshead 22 again is guided relatively to the upper portion of the crank case by two tie rods 23 having a comparatively great diameter and guided in two bushings 25 comparatively widely spaced in the upper portion of the crank case, the latter is closed, and the tie rods are led oil-tight through the bushings 25. The tie rods 23 have a rectilinear motion parallel with the controlling piston and are connected by means of two inclined rods 24 with a crosshead 14 carrying the controlling piston. The crosshead 14 is perpendicular to the central plane of the engine, and the inclined rods are, therefore, so shaped as to form a connecting link between the crosshead 14, which is perpendicular to the central plane of the engine, and the tie rods 23 which are placed outside the plane of motion of the crosshead. The invention is not limited to the construction specified above with reference to the drawings, this construction being only given by way of example, as above stated.

I claim:

1. In an internal combustion engine, a cylinder, oppositely moving working and controlling pistons mounted in said cylinder, the head surface of the controlling piston forming part of the combustion chamber in the cylinder, a crank shaft including a crank pin connected with the working piston, bearings for the crank shaft, a single eccentric element on the crank shaft located intermediate the crank pin and one of the crank shaft bearings, and means connecting the eccentric element with the controlling piston for imparting reciprocatory movements thereto, said means including two rods disposed in a plane at right angles to the axis of the crank shaft and parallel with the central vertical plane passing through the main connecting rod, and inclined rods connecting the first mentioned rods with a cross head connected with the controlling piston.

2. In an internal combustion engine, a cylinder, oppositely moving working and controlling pistons mounted in said cylinder, the head surface of the controlling piston forming part of the combustion chamber in the cylinder, a crank shaft including a crank pin connected with the working piston, bearings for the crank shaft, a single eccentric element on the crank shaft located intermediate the crank pin and one of the crank shaft bearings, and means connecting the eccentric element with the controlling piston for imparting reciprocatory movement thereto of less amplitude than the working piston, said means including two rods disposed in a plane at right angles to the axis of the crank shaft and parallel with the central vertical plane passing through the main connecting rod, and inclined rods connecting the first mentioned rods with a cross head connected with the controlling piston, said piston being of less diameter than the working piston.

In testimony whereof I affix my signature.

TORKILD VALDEMAR HEMMINGSEN.